Figure 1:
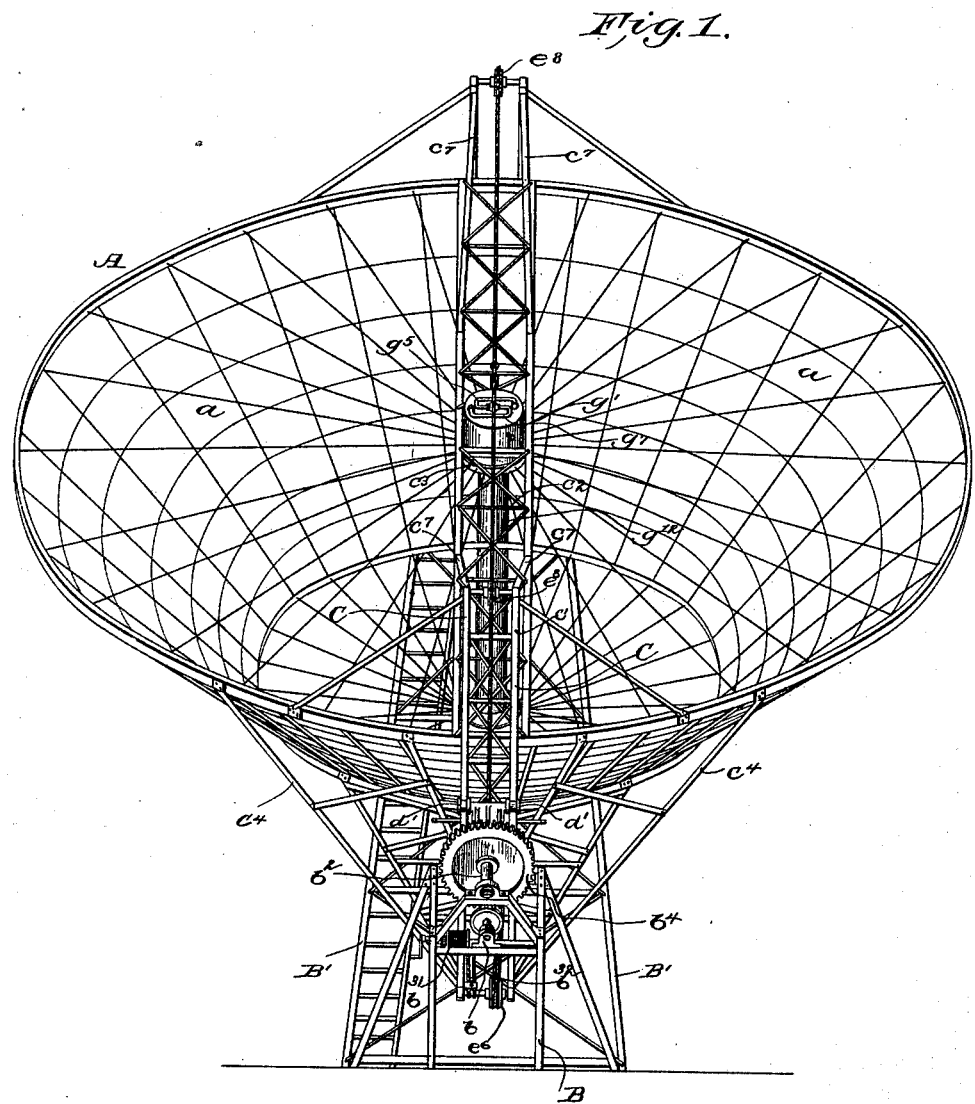

No. 670,917. Patented Mar. 26, 1901.
A. G. ENEAS.
SOLAR GENERATOR.
(Application filed Aug. 20, 1900.)
(No Model.) 5 Sheets—Sheet 1.

Witnesses:
W. C. Lunsford.
Fred S. Greenleaf.

Inventor:
Aubrey G. Eneas,
by Crosby Gregory.
Atty's.

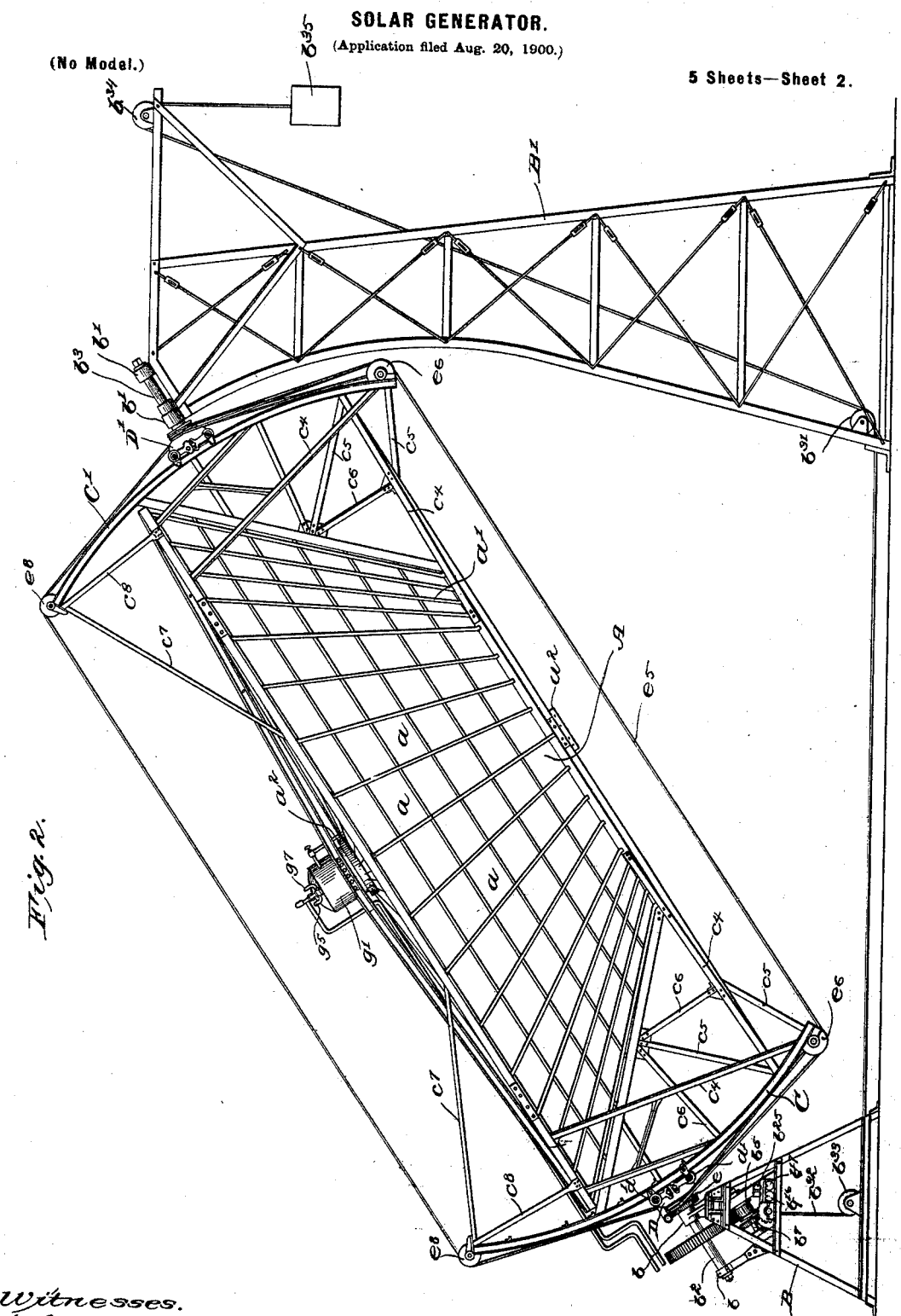

No. 670,917. Patented Mar. 26, 1901.
A. G. ENEAS.
SOLAR GENERATOR.
(Application filed Aug. 20, 1900.)
(No Model.) 5 Sheets—Sheet 3.
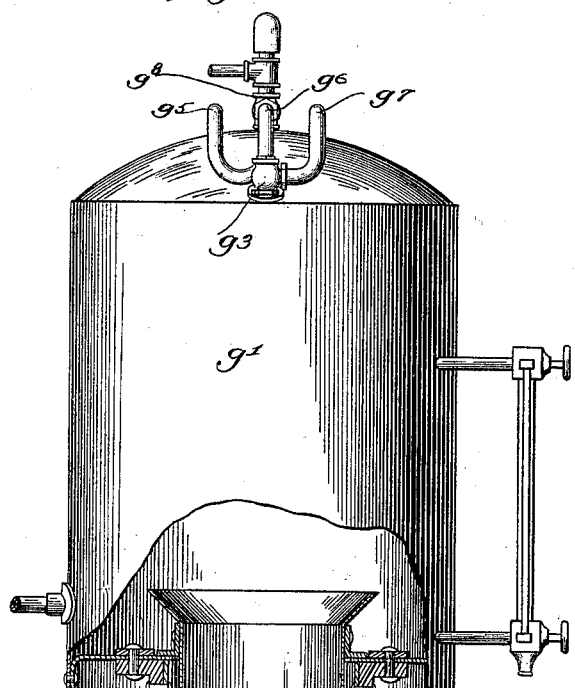
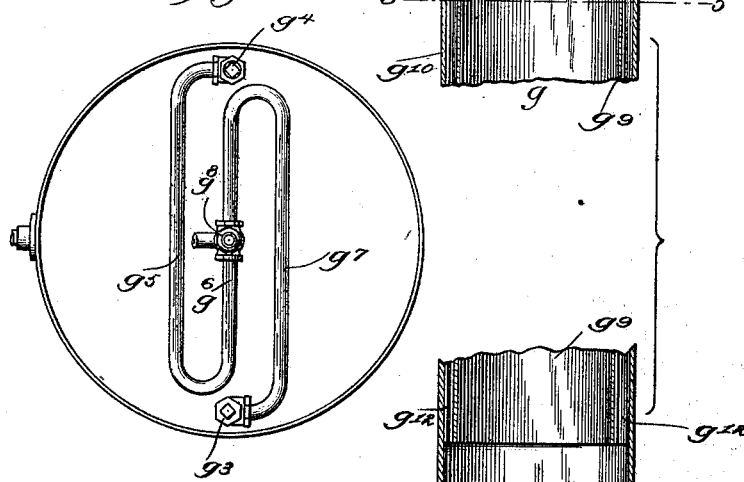
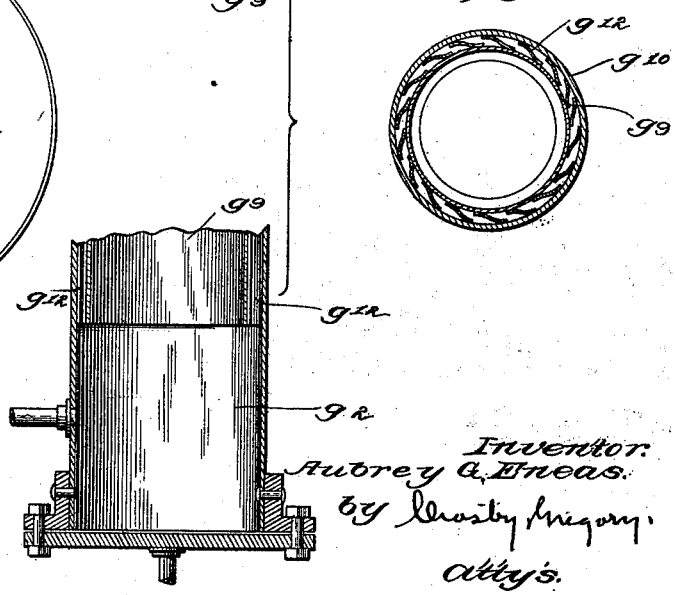
Witnesses,
Inventor:
Aubrey G. Eneas.
by Crosby Gregory
Atty's.

No. 670,917. Patented Mar. 26, 1901.
A. G. ENEAS.
SOLAR GENERATOR.
(Application filed Aug. 20, 1900.)

(No Model.) 5 Sheets—Sheet 4.

Witnesses.
M. C. Simsford
Fred S. Greenhof

Inventor:
Aubrey G. Eneas,
By Crosby Gregory,
Attys.

THE NORRIS PETERS CO., PHOTO-LITHO., WASHINGTON, D. C.

No. 670,917. Patented Mar. 26, 1901.
A. G. ENEAS.
SOLAR GENERATOR.
(Application filed Aug. 20, 1900.)
(No Model.) 5 Sheets—Sheet 5.
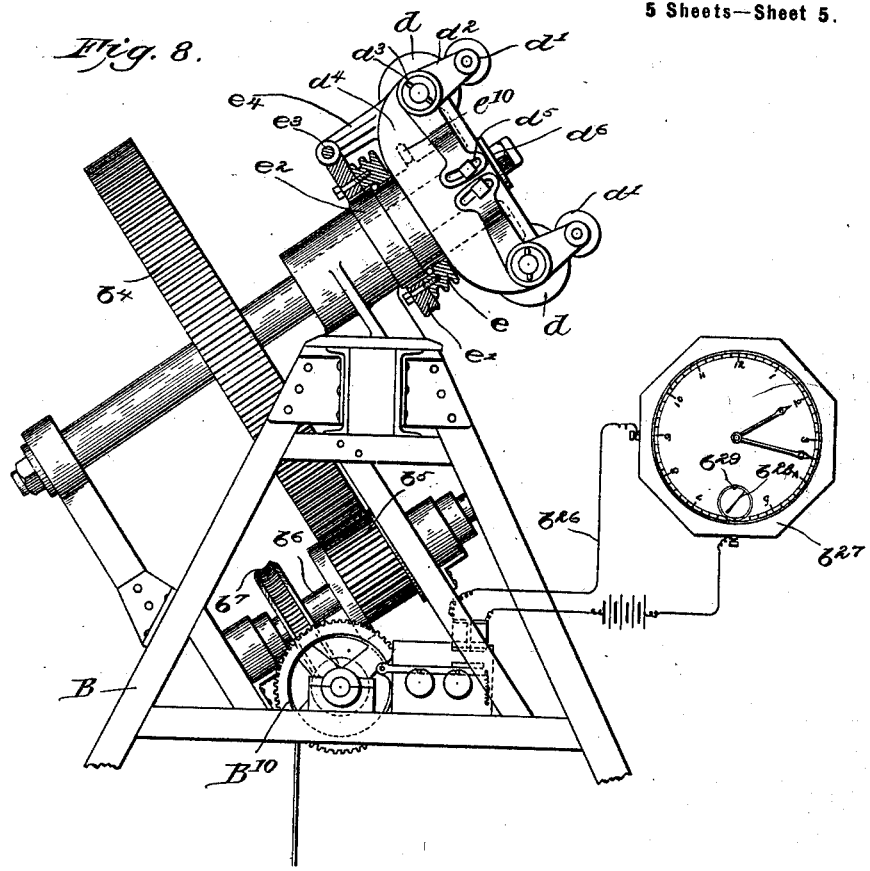
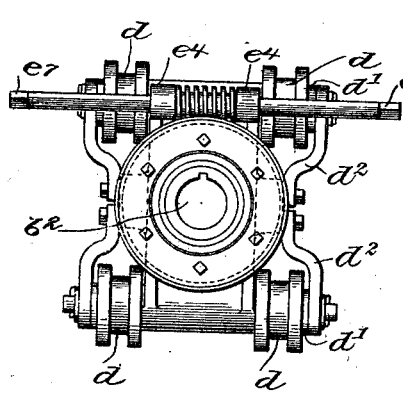
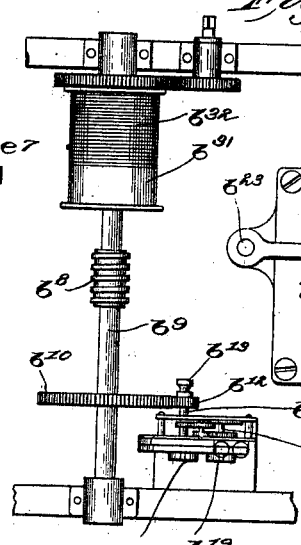
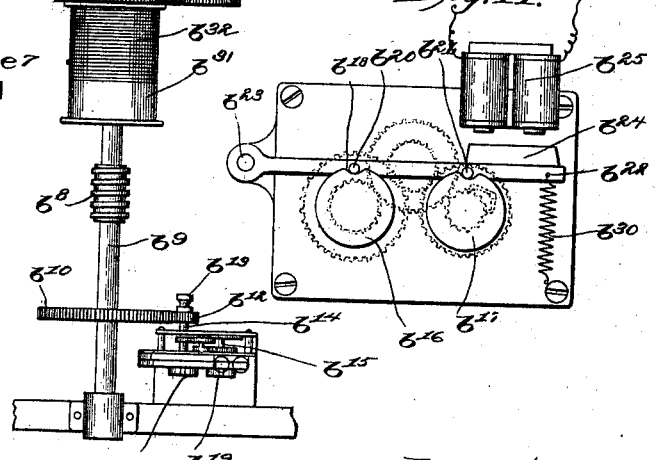
Witnesses.
H. C. Lunsford
Fred. S. Greenleaf
Inventor:
Aubrey G. Eneas.
by Crosby Gregory.
attys.

United States Patent Office.

AUBREY G. ENEAS, OF BOSTON, MASSACHUSETTS, ASSIGNOR TO SOLAR MOTOR COMPANY, OF SAME PLACE AND JERSEY CITY, NEW JERSEY.

SOLAR GENERATOR.

SPECIFICATION forming part of Letters Patent No. 670,917, dated March 26, 1901.

Application filed August 20, 1900. Serial No. 27,403. (No model.)

*To all whom it may concern:*

Be it known that I, AUBREY G. ENEAS, a subject of the Queen of Great Britain, residing at Boston, county of Suffolk, State of Massachusetts, have invented an Improvement in Solar Generators, of which the following description, in connection with the accompanying drawings, is a specification, like letters on the drawings representing like parts.

My present invention is an apparatus for utilizing the direct heat of the sun's rays for generating steam or otherwise taking advantage of the stored-up energy thereof. Various inventions in this general line have already been suggested, many of them having been patented; but so far as I am aware a quite common defect resides in the inability of this class of devices to maintain a correct focus at all periods of the year and throughout the day. This problem is not so simple as at first sight might appear.

In the present embodiment of my invention I provide a large reflector of a conical shape supported at opposite points in the plane of the meridian and arranged to turn on said points in following the apparent daily movement of the sun and also arranged to move in the vertical plane of said supporting-points according to the declination of the sun, and if in such an apparatus the pivotal axis of the reflector remains perpendicular at all times to the focal axis of the reflector it follows that the reflector will not turn in its daily movement so as to carry its focal axis in the plane of the sun's diurnal path, excepting for those two days in the year when the sun moves in a plane at a right angle to said axis of rotation of the reflector. So far as I am aware I am the first to make this discovery with two fixed opposite independent supports, and accordingly one of the leading features of my invention resides in providing means for maintaining the reflector, as stated, in focus with the sun irrespective of the changes in the sun's declination when the opposite supports are fixed. I accomplish this object by changing the plane of movement of the axis of the reflector relative to a plane perpendicular to the pivotal axis, or, in other words, instead of maintaining the reflector's axis at all times perpendicular to the pivotal axis of the reflector I vary the angle thereof according to the declination of the sun. The pivotal axis of the reflector is fixed in the meridian of the place at an angle corresponding to the latitude of the place, or, stated in a more general form, the angle of the axis of the reflector changes relatively to a fixed bearing on which the reflector is supported at its opposite sides. This feature, as well as other important features of my invention and the details of the mechanical embodiment thereof, will be specifically explained in the course of the following description, reference being had to the accompanying drawings, in which a preferred embodiment of my invention is shown, and the latter will be more particularly pointed out in the appended claims, also forming part of this specification.

Figure 6:
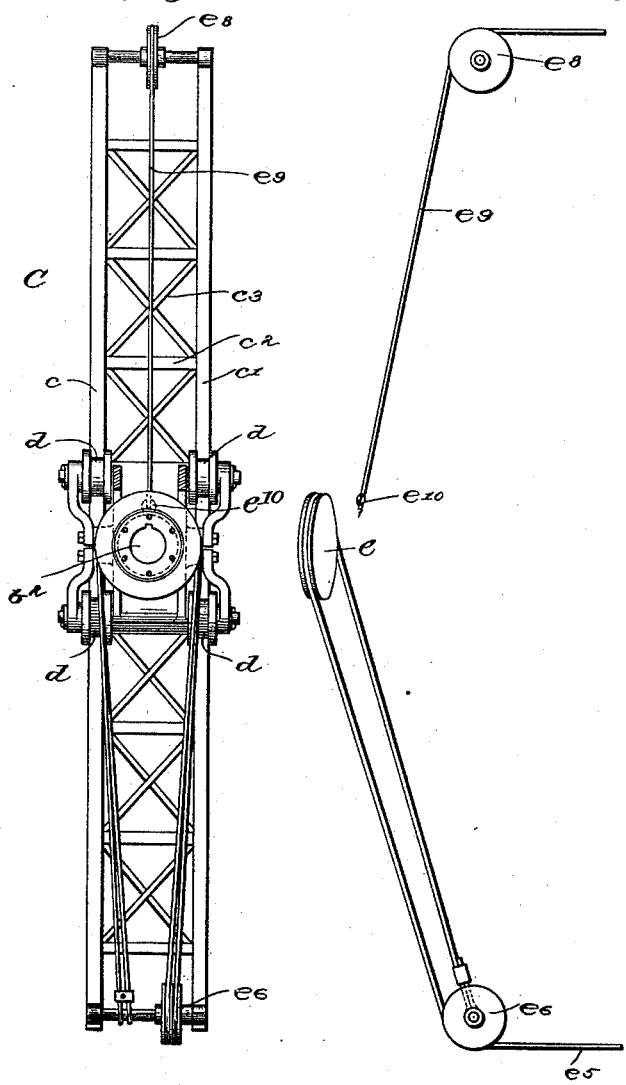
Figure 7:
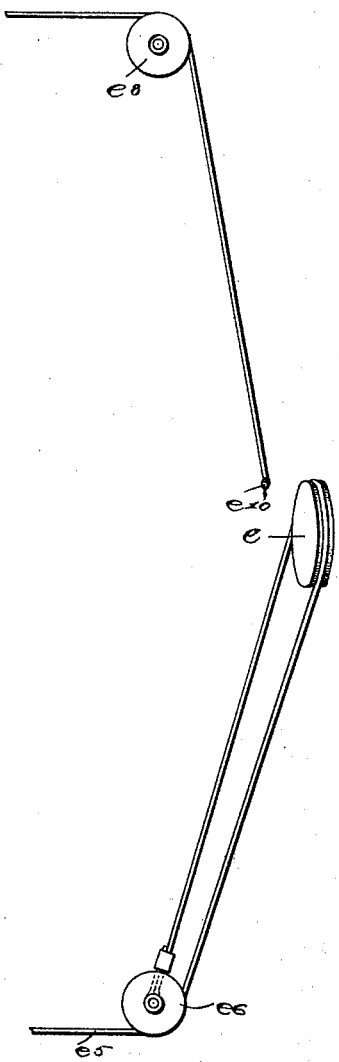

In the drawings, Figure 1 represents in front elevation a solar generator constructed according to my invention. Fig. 2 shows the same in side elevation. Fig. 3 is an enlarged detail, partly in section and partly in side elevation, largely broken away, showing the boiler or steam-generating apparatus. Fig. 4 is a top plan view thereof. Fig. 5 is a horizontal section on the line 5 5, Fig. 3. Fig. 6 is an enlarged detail, in front elevation, showing one of the trolley-tracks with the trolley in position. Fig. 7 represents in side elevation, partly broken away, the declination-pulleys and tipping apparatus. Fig. 8 is an enlarged detail, in side elevation and partly in section, showing the turning mechanism. Fig. 9 is a front elevation of the trolley and adjacent lock therefor. Fig. 10 is a broken detail showing in top plan view the controller, winding-drum, and adjacent parts; and Fig. 11 is an enlarged side elevation of the controller or electrical regulator which I prefer to employ.

Referring more particularly to Figs. 1 and 2, it will be seen that the reflector proper, A, has curved sloping walls or is of that kind in which the reflecting-surface thereof directs the sun's rays to a common focal line or axis, being "conical," although I do not mean this term to limit me strictly to a portion of a cone proper; but I mean thereby to include all shapes having curved sloping walls capable of focusing the sun's rays along a common axial line or plane, preferably having an open top and bottom, said reflector being preferably composed of a plurality of facets $a$ of suitable reflecting-surface, such as glass or other mirrors, and a backing-frame $a'$, composed of angle-irons or other construction suitable for the purpose, the top and bottom being retained in proper curvature by strain-rings $a^2$.

At its opposite sides the reflector A is provided with supports B B', containing fixed bearings $b$ $b'$ at the upper ends, in which are alined pivotal shafts. The axes or center of shafts $b^2$ and $b^3$, or, in other words, the relative height of the two supports B B', is at an angle corresponding to the latitude of the place where the instrument is set up, and the instrument is bodily movable angularly in a vertical plane including said pivotal supports.

It will be understood that the movement last referred to may be secured in any suitable or convenient manner, the means preferred by me being herein shown as comprising end tracks C C', curved on an arc whose center corresponds with the center of gravity of the reflector and connected parts, whereby the machine will at all times be in proper equilibrium, thereby rendering it possible to operate it with minimum power and under all the trying conditions of wind and weather to which such an instrument is necessarily subjected.

The curved tracks C C' are herein shown as arranged in pairs, one of which is indicated in Fig. 6, where it will be seen to comprise opposite tracks $c$ $c'$, connected by braces $c^2$ and tie-bars $c^3$ or other suitable thrust connection and supported rigidly in the required position by beams $c^4$, struts $c^5$, and braces $c^6$, arranged to receive all the direct and lateral thrusts due to the weight of the machine and the wind-pressure, &c. At its upper end each track is supported by braces $c^7$ and struts $c^8$. The two sets of tracks and details of construction are similar for both the upper and lower ends of the machine. These tracks accommodate suitable "trolleys," as they may be termed, or antifriction devices D D', on which the tracks move in effecting the changes of position required by the reflector.

Referring more particularly to Figs. 6, 8, and 9, it will be seen that each trolley has four wheels $d$, arranged in two pairs to travel on the respective rails C C' of the adjacent track, and also has corresponding retaining wheels or rolls D', supported by bell-crank arms $d^2$, pivoted at $d^3$ on the head $d^4$ of the trolley in position to bear against the inner sides of the rails opposite the respective wheels $d$. The bell-cranks $d^2$ are adjustable at $d^5$ for the purpose of enabling the trolleys to be accurately adjusted so as to maintain the machine in precise position as required. The head $d^4$ of each trolley is mounted on and to turn the projecting end of the respective shaft $b^2$ or $b^3$, as the case may be, being retained by any suitable means, as a nut and washer $d^6$. The lower shaft $b^2$ carries a large gear $b^4$ in mesh with a pinion $b^5$, journaled in the support B and having its shaft $b^6$ provided with a worm-wheel $b^7$, driven by a worm $b^8$ on a shaft $b^9$, provided with a gear $b^{10}$, driven by a pinion $b^{12}$ of a releasing device $b^{13}$, retained fast on a shaft $b^{14}$ by a controlling mechanism somewhat resembling clockwork. Said mechanism may be considerably varied, and has besides a shaft $b^{14}$ the shaft $b^{15}$ and proper pinions and connections for transmitting motion, as is clearly shown, said shafts $b^{14}$ and $b^{15}$ having at their ends stopping devices, shown as disks $b^{16}$ $b^{17}$, provided with notches $b^{18}$ $b^{19}$, adapted to receive pins $b^{20}$ $b^{21}$, projecting from a lever or detent $b^{22}$, pivoted at $b^{23}$ and carrying an armature $b^{24}$ at its outer end, arranged to be attracted by a magnet $b^{25}$, attached to a bracket, energized at suitable intervals by a current from a circuit $b^{26}$, leading from an electrical clock or make-and-break device $b^{27}$, herein shown as making the circuit by means of a second hand $b^{28}$, engaging an electrical contact $b^{29}$ on the face of the clock. The armature is given quick action by a spring $b^{30}$, and the motive power which serves to turn the train of gearing of the controller and adjacent parts consists of a windlass or drum $b^{31}$, on which is wound a rope $b^{32}$, passing under a direction-pulley $b^{33}$ and over a pulley $b^{34}$ at the top of the support B', said rope being provided at its free end with a weight $b^{35}$. Said weight gives a tendency to the train of mechanism described to operate whenever the disengaging of the pins $b^{20}$ $b^{21}$ from the disks $b^{16}$ $b^{17}$ makes such operation possible, said disengagement being effected by the electrical make-and-break device $b^{27}$.

The reason for the mechanism just described is that with the varying pressure due to winds any clock directly connected to the moving mechanism is incapable of giving uniformity of daily movement to the reflector, and yet in this class of machines the movement of the reflector must be absolutely uniform, as otherwise the reflector will not accurately follow the sun's movements, and it is obvious that if the reflector gets out of focus to the slightest extent the machine is rendered practically useless.

Irregularity of movement of the reflector or imperfect focus thereof is equivalent to removing just so much of the fuel from the boiler, and in order that this disastrous result may not take place and that the machine may be given uniform movement at all times irrespective of the direction or the velocity of the wind and the conditions of temperature, &c., I have provided a powerful motor in the form of the gearing and parts $b^4$ to $b^{15}$ and a weight and have combined therewith the releasing device or controller and an independently-operated clock which permits said motor to become effective at regular intervals only, thereby insuring that the reflector will be turned by a rapid succession of small increments of movement just sufficient to keep it in focus continuously. As herein shown, the gearing on and between the shafts $b^{14}$ $b^{15}$ is such that the ratio of rotation of said shafts is as sixteen to one, so that when the disks $b^{16}$ $b^{17}$ are released the latter rotates sixteen times before the two notches $b^{18}b^{19}$ are in vertical position to receive simultaneously the pins $b^{20}$ $b^{21}$, and this period of time gives opportunity for motion to be communicated to the reflector through the worm-gear and gearing and yet insures that said motion will be properly limited, and also by reason of the locking provision of the worm-wheel and worm the moving force must all come from the weight acting on the worm and cannot come from any wind-pressure or other strain acting through the gearing in the reverse direction.

To accomplish the changes in inclination of the reflector to correspond to the apparent annual movements of the sun, I have mounted coaxially on the pivotal supports of the reflector suitable pulleys, herein shown as mounted immediately behind the heads $d^4$ of the trolleys, one of said pulleys being shown in section in Fig. 8 at $e$ and being shown as bolted to a worm-wheel $e'$ to turn freely on the bearing $e^2$. The worm-wheel is engaged by a worm $e^3$, mounted in arms $e^4$, projecting from the heads $d^4$. A rope $e^5$ (see Figs. 2, 6, and 7) is secured at its ends to the lower part of the reflector, being shown as secured to the lower ends of the track and passes about the opposite pulleys or declination-wheels $e$ $e$ and under direction-pulleys $e^6$, journaled for convenience in the lower ends of the tracks C C', so that as a worm $e^3$ is turned by any suitable means, as by cranks applied to the squared ends (see Fig. 9) of its shaft, the adjacent pulley $e$ will be positively turned one way or the other, thereby correspondingly pulling upon one or the other strand of the rope $e^5$, so as to simultaneously lift one of the tracks and depress the opposite track, or vice versa. Also the worm and worm-wheel construction serves as a positive lock to hold the parts in absolutely rigid position as adjusted, preventing any possibility of shifting due to wind-pressures, &c., and extraneous means. At the upper ends the tracks are provided with direction-pulleys $e^8$, over which passes a steadying-cable $e^9$, secured at its ends to any convenient place, as in eyes $e^{10}$, provided on the heads $d^4$ of the trolleys. This provision prevents any shifting movement of the reflector which might otherwise be due to wind-pressures, &c., applied against the lower side of the reflector.

Referring now to Figs. 3 and 5, taken in connection with Figs. 1 and 2, it will be seen that I have mounted in the focus of the reflector a steam-generating apparatus comprising a central portion or boiler $g$, an upper portion or combined steam and hot-water drum $g'$, and lower portion or mud-drum or settling-chamber $g^2$. The upper portion of the steam-generating apparatus is required, as will be evident upon a moment's attention, to assume all the various positions from one horizontal position at sunrise to the opposite horizontal position at sunset, and if the steam-outlet were located centrally of the dome it is obvious that the water contained in the chamber $g'$ would run out whenever the reflector was tipped considerably. In order to prevent the disastrous consequences which would follow such a result, I have provided two steam-outlets, indicated, respectively, at $g^3 g^4$, (see Fig. 4,) said steam-outlets being connected by pipes $g^5$ $g^6$ $g^7$, which together form an S-shaped pipe or oppositely-extending loops or bends, which may be arched across the dome of the steam and hot-water drum $g'$, as shown in Fig. 3, a steam-outlet being centrally provided at $g^8$ in the intermediate pipe or branch $g^6$.

In operation if the reflector is tipped extremely to one side, so as to bring the water-level over the center $g^8$, the water cannot escape thereat because although the lower steam-outlet—as, for instance, $g^3$—will then be below the water-level the other steam-outlet $g^4$ will necessarily be above the water-level, so that the steam can pass out through the pipes $g^5$ $g^6$ to the central outlet $g^8$, whereas, on the other hand, if the apparatus is tipped to an extreme in the opposite direction the steam-outlet $g^4$ will be rendered inoperative because of the closure thereof by the contained water, but the opposite outlet $g^3$ will be opened for the passage of steam, which may freely escape through the pipes $g^6$ $g^7$ and central outlet $g^8$. This feature of my invention is of considerable importance, and it prevents the liability of the apparatus blowing up or otherwise destroying itself, and it renders the machine completely operative in the respect noted, wherein it was before incomplete and improperly constructed. For the best results the portion $g'$ should have a larger diameter than the portion $g$ in order that when the parts are tipped to an extreme extent there may be sufficient space within the portion $g'$ to receive the steam and permit the escape thereof through the upper outlet $g^3$ or $g^4$, as the case may be. The steam-generating portion $g$ consists of an inner shell or casing $g^9$ and an outer shell or casing $g^{10}$, the sun's reflected rays striking against the latter and being conducted to the body of water within, which in turn is converted into steam; and so that the conduction of the heat from the outer casing to the water within it may be rapid and take place to the best advantage I have provided a series of spring-clips $g^{12}$, which bear yieldingly against both casings, thereby insuring a positive direct contact with the surfaces thereof, which in operation are usually more or less rough, this spring arrangement also coöperating with the inevitable expansion and contraction due to the extremes of temperature to which they are subjected at different times.

The operation of my solar generator is as follows: The two stationary supports B B' are of such proportion as to height as to bring the center line or axial line of bearings so as to correspond to the latitude of the place, said supports being erected in a plane parallel to the meridian of the place. The reflector is then turned angularly in a vertical plane—i. e., its tracks c c' are slid on the trolleys or pivotal points until the focal line or axis of the reflector points to the sun. Having thus adjusted the apparatus, the reflector is turned at sunrise, so that its axial or focal line will be horizontal, thereby pointing directly at the horizon, and in this position at sunrise the turning mechanism is set in operation and continues to turn the machine at a uniform rate, maintaining it in focus with the sun as the latter travels as it is turned until sunset, at which time the focal line of the reflector is again horizontal or pointing at the horizon in a direction opposite to that in the morning. The machine is changed day by day to correspond exactly to the sun's declination, being in the median position shown in Fig. 2 at the equinoxes, and being at one side or the other thereof in the intermediate periods of winter and summer.

One great advantage of my construction is that it solves in a simple manner the problem of varying the time of swinging the reflector from sunrise-horizon position to sunset-horizon position to correspond to the varying lengths of the days, which, so far as I am aware, has never before been solved in a solar generator having is reflector pivotally supported at opposite sides without adjusting the clock or controlling device, thereby securing uniform movement of the reflector and yet insuring that the focal line of the reflector will pass through the arc of its movement or travel to the opposite horizontal position, or from sunrise to sunset, in precisely the same time that the sun takes in appearing to pass from sunrise to sunset, this time being short in winter and long in summer. It is obvious that unless the machine accomplishes this result it will practically be inoperative.

I have already explained that the turning-motor is permitted to be actuated by the weight $b^{35}$ step by step and at intervals, according to the electrical contacts made by the mechanism $b^{27}$, and the other part of the operation whereby the focal line, which in the present instance corresponds to the boiler, passes from one horizontal position to the opposite horizontal position is due to the fact that said focal line or said boiler is not in a fixed position relatively to the pivotal line of the reflector, but, on the contrary, varies according to the day of the year. Said pivotal line is herein shown as fixed—that is to say, the shafts $b^2$ $b^3$ are fixed to turn in one and the same position, whereas the boiler and reflector are not fixed, but change their angularity relative to the said pivotal lines, being perpendicular thereto at equinoxes, as shown, and forming an acute angle with the upper portion of said axial line in the winter-time and an acute angle with the lower portion of said axial line in the summer-time, due to the movement of the tracks $c$ $c'$ upon the trolleys $d$ $d'$, and this capability of turning to the extreme horizontal positions does not render the device inoperative by permitting the boiler to empty itself, but the machine continues operative so far as relates to this feature by means of the construction shown in Fig. 4, which renders it certain that the steam shall always have a free outlet without permitting any of the water to flow with it.

It will be understood that many changes in form, relation, and arrangement of parts may be resorted to without departing from the spirit of my invention, and therefore I do not otherwise limit myself than as expressed hereinafter in the claims.

Having described my invention, what I claim, and desire to secure by Letters Patent, is—

1. A solar generator comprising a reflector having curved, sloping walls, fixed supports for reflector at opposite points of the reflector, said reflector being mounted to turn on said support for its diurnal movement, and means for varying the angle of the focal axis of the reflector relatively to the fixed pivotal diurnal axis of the reflector according to the declination of the sun.

2. A solar generator comprising a reflector having a curved reflecting-surface focusing at all points along a straight line or a focal axis, pivotal fixed supports for said reflector at opposite sides thereof for the diurnal movement of the reflector, and means for varying the angle of the focal axis relatively to the said fixed pivotal diurnal axis of the reflector according to the declination of the sun.

3. A solar generator comprising a reflector whose surface reflects the sun's rays to a common focal line or axis, fixed bearings for the diurnal turning of said reflector at opposite sides thereof, and means for adjusting the reflector according to the declination of the sun to vary the plane of movement of the focal axis thereof relatively to the center line of said fixed bearings.

4. A solar generator comprising opposite fixed supports set in alinement with the meridian of the place, said supports containing fixed pivotal bearings at unequal heights, the axial line of said bearings extending at an angle corresponding to the latitude of the place, a reflector mounted at its opposite sides to turn on said bearings, said reflector having curved walls of the conical type described, and means for tipping said reflector so as to vary the angle of the focal axis thereof relatively to said pivotal line, and means to turn said reflector on said bearings.

5. In a solar generator, opposite fixed supports of unequal heights, each carrying a fixed pivotal bearing for diurnal movement, a reflector carried by said pivotal bearings, and means for shifting said reflector transversely of said pivotal bearings into an angular position to correspond to the declination of the sun following the latter's annual movement.

6. In a solar generator, a reflector, having at opposite sides approximately vertical tracks, fixed supports, each of said supports being provided with pivotal bearings for said reflector, and connections between said pivotal supports for moving said tracks relatively to said pivotal bearings.

7. In a solar generator, a reflector, having at its opposite sides tracks, supports for said reflector, said supports being provided with trolley devices pivoted in said supports for receiving said tracks, and means for shifting said tracks simultaneously in opposite directions relatively to the respective supports.

8. In a solar generator, independent supports each provided with a pivotal bearing, said pivotal bearings being in longitudinal alinement, a reflector mounted on said pivotal bearings and having its center of gravity approximately in the line of said pivotal bearings, means for shifting said reflector relatively to said pivotal bearings, said reflector being maintained with its center of gravity in the said pivotal line in all the changing positions of the reflector.

9. A reflector provided at opposite sides with arc-shaped tracks, opposite supports for said tracks, each support having a fixed journal-bearing provided with means for engaging the adjacent track, said bearings when in an intermediate position relatively to said tracks serving to support said reflector in the line of its center of gravity or in equilibrium, and means for moving said tracks relatively to the said fixed bearings without destroying said equilibrium.

10. In a solar generator, a reflector, adapted to gather the sun's rays to a common focus, and means for turning said reflector at uniform speed unaffected by wind-pressure, &c., to follow the diurnal movement of the sun, said turning means comprising a motor tending at all times to turn the reflector and a controller for rendering said motor operative at regular short intervals throughout the day and inoperative for the intervening intervals.

11. In a solar generator, a reflector, adapted to gather the sun's rays to a common focus, and turning means for maintaining a uniform speed irrespective of variations in wind-pressure, position of the reflector, &c., following the diurnal movement of the sun, said turning means comprising a motor tending at all times to turn the reflector and a controller for rendering said motor operative at regular short intervals throughout the day and inoperative for the intervening intervals, said controller including a stopping device and detent, and a secondary independently-operated controlling mechanism as a clock, regulating the action thereof.

12. In a solar generator, a reflector, a track, a pivot on which the reflector may turn, and a trolley carried by said pivot to engage said track, said trolley comprising pairs of wheels adapted to engage the front side and back side of said track.

13. In a solar generator, a reflector, a track, a pivot on which the reflector may turn, and a trolley carried by said pivot to engage said track, said trolley comprising pairs of wheels adapted to engage the front side and the back side of said track, and means for adjusting said pairs of wheels so as to make a close fit on said tracks.

14. In a solar generator, a reflector, having at its opposite sides pivotal supports, guiding devices to hold said reflector in position relatively to said supports, declination-wheels mounted in fixed position, direction-pulleys mounted on the reflector, and a cable fastened at its ends to the reflector and passing about said declination-wheels and said direction-pulleys whereby a movement of the cable will simultaneously move the opposite sides of the reflector in opposite directions.

15. In a solar generator, a reflector, having at its opposite sides pivotal supports, guiding devices to hold said reflector in position relatively to said supports, declination-wheels mounted in fixed position, direction-pulleys mounted on the reflector, and a cable fastened at its ends to the reflector and passing about said declination-wheels and said direction-pulleys, and other direction-pulleys mounted on the reflector opposite the first-mentioned direction-pulleys, and a steadying-cable secured in fixed position at its ends and passing over said second-mentioned direction-pulleys.

16. In a solar generator, a reflector of the conical type described, supports therefor permitting said reflector to follow the diurnal movement of the sun, a steam-generating apparatus in the focus of the reflector, said steam-generating apparatus having a lower portion to receive water to be converted into steam and an upper portion to receive the steam and water, said boiler being tipped with the reflector, and means for preventing the water from escaping with the steam through the top of the steam-generating apparatus when the latter is tipped into approximately horizontal position.

17. In a solar generator, a reflector of the conical type described, pivotal supports therefor permitting said reflector to follow the diurnal movement of the sun, a steam-generating apparatus in the focus of the reflector, said steam-generating apparatus having a lower portion to receive water to be converted into steam and an upper portion to receive the steam and water, said boiler being tipped with the reflector, and means for preventing the water from escaping with the steam through the top of the steam-generating apparatus when the latter is tipped into approximately horizontal position, said means including a steam-outlet on the upper side of the top of the steam-generating apparatus, and pipe in the form of a loop extending substantially across the steam-generating apparatus for the escape of the steam.

18. In a solar generator, a reflector of the conical type described, pivotal supports therefor permitting said reflector to follow the diurnal movement of the sun, a steam-generating apparatus in the focus of the reflector, said steam-generating apparatus having a lower portion to receive water to be converted into steam and an upper portion to receive the steam and water, said boiler being tipped with the reflector, and means for preventing the water from escaping with the steam through the top of the steam-generating apparatus when the latter is tipped into approximately horizontal position, said means including a steam-outlet provided at the opposite upper and lower sides of the top of the steam-generating apparatus, and a pipe extending in the form of a double loop or S-shaped, substantially across the steam-generating apparatus and connecting said two outlets and provided at approximately the center with an outlet for the steam.

19. In a solar generator, a steam-generating apparatus comprising a boiler having concentric surfaces and a series of vertically-disposed spring strips or plates between said two surfaces and pressing yieldingly against the same for conducting the heat from the outer surface to the inner surface and permitting the relative expansion and contraction of the parts.

In testimony whereof I have signed my name to this specification in the presence of two subscribing witnesses.

AUBREY G. ENEAS.

Witnesses:
GEO. H. MAXWELL,
GEO. W. GREGORY.